(12) United States Patent
Sekine et al.

(10) Patent No.: US 10,638,045 B2
(45) Date of Patent: Apr. 28, 2020

(54) IMAGE PROCESSING APPARATUS, IMAGE PICKUP SYSTEM AND MOVING APPARATUS

(71) Applicant: CANON KABUSHIKI KAISHA, Tokyo (JP)

(72) Inventors: Hiroshi Sekine, Kawasaki (JP); Kazunari Kawabata, Port Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/227,216

(22) Filed: Dec. 20, 2018

(65) Prior Publication Data
US 2019/0199929 A1 Jun. 27, 2019

(30) Foreign Application Priority Data
Dec. 25, 2017 (JP) .................. 2017-247836

(51) Int. Cl.
| | |
|---|---|
| H04N 5/235 | (2006.01) |
| H04N 5/232 | (2006.01) |
| G06T 7/00 | (2017.01) |
| H04N 5/3745 | (2011.01) |
| H04N 5/353 | (2011.01) |
| H04N 5/217 | (2011.01) |

(52) U.S. Cl.
CPC ....... *H04N 5/23267* (2013.01); *G06T 7/0002* (2013.01); *H04N 5/217* (2013.01); *H04N 5/2353* (2013.01); *H04N 5/353* (2013.01); *H04N 5/37452* (2013.01); *G06T 2207/30168* (2013.01)

(58) Field of Classification Search
CPC .. H04N 5/23267; H04N 5/2353; H04N 5/217; H04N 5/353; H04N 5/37452; G06T 7/0002; G06T 2207/30168; G06T 5/003; G06T 2207/10144
See application file for complete search history.

(56) References Cited

U.S. PATENT DOCUMENTS 5,862,420 A * 1/1999 Akimoto ................ G03B 7/097
396/236
6,784,938 B1 * 8/2004 Kidono .............. H04N 5/23296
348/362
(Continued)

FOREIGN PATENT DOCUMENTS

| JP | 2009-049575 A | 3/2009 |
|---|---|---|
| JP | 2017-055321 A | 3/2017 |

*Primary Examiner* — Mekonnen D Dagnew
(74) *Attorney, Agent, or Firm* — Venable LLP

(57) ABSTRACT

An image processing apparatus has an acquisition unit that acquires a first image captured by coded exposure in which a transfer unit is driven for n times, and acquires a second image captured by driving the transfer unit for m times (m<n), an image correction processing unit that generates a third image by performing blur correction processing on the first image, and an image comparison unit that evaluates a plurality of images including at least two of the first image, the second image, and the third image, and selects an image of which evaluation is the highest among the plurality of images as an output image, or increases a weight for an image of which evaluation is highest among the plurality of images, relative to those of the other images, when an output image is generated by combining the plurality of images.

18 Claims, 11 Drawing Sheets

(56) References Cited

U.S. PATENT DOCUMENTS

| | | | |
|---|---|---|---|
| 8,436,907 B2 | 5/2013 | McCloskey | |
| 2005/0062875 A1* | 3/2005 | Ojima | H04N 5/23216 |
| | | | 348/362 |
| 2007/0258706 A1* | 11/2007 | Raskar | H04N 5/23248 |
| | | | 396/52 |
| 2009/0179995 A1* | 7/2009 | Fukumoto | H04N 5/23248 |
| | | | 348/208.6 |
| 2010/0321510 A1* | 12/2010 | Tsutsumi | G06T 5/003 |
| | | | 348/208.4 |
| 2011/0075020 A1* | 3/2011 | Veeraraghavan | G06T 3/4053 |
| | | | 348/367 |
| 2017/0078557 A1 | 3/2017 | Kawabata et al. | |

* cited by examiner

IMAGE PROCESSING APPARATUS, IMAGE PICKUP SYSTEM AND MOVING APPARATUS

BACKGROUND OF THE INVENTION

This application claims the benefit of Japanese Patent Application No. 2017-247836, filed Dec. 25, 2017, which is hereby incorporated by reference herein in its entirety.

Field of the Invention

The present invention relates to a technique to acquire high quality images using coded exposure.

Description of the Related Art

As a method of correcting blur of a captured image, a coded exposure method is used. According to the coded exposure method, imaging is performed while temporally coding (modulating) an exposure, and blur correction processing is performed on the acquired coded exposure image, so as to generate a restored image in which blur has been reduced or eliminated. U.S. Pat. No. 8,436,907 discloses a technique to improve the correction accuracy of the coded exposure image based on an image captured by a normal image pickup method when the coded exposure image is acquired.

SUMMARY OF THE INVENTION

The relative merits of an image quality between a normal exposure image and a restored image based on a coded exposure image changes depending on the illuminance of the object and the imaging environment, and it is difficult to determine the relative merits in advance. If an attempt is made to determine the relative merits, many information detection units and an enormous computing volume before imaging are required, and a chance of capturing an object that should be imaged may be missed.

U.S. Pat. No. 8,436,907 discloses a method of increasing the precision of the blur correction processing by performing "coded exposure" and "normal exposure" alternately, but there is no concept that explains the relative merits between these images, and the image quality of a moving image (image) captured by this method does not necessarily improve.

With the foregoing in view, it is an object of the present invention to provide a technique to easily acquire high quality images with minimal blur.

A first aspect of the present invention provides an image processing apparatus having an acquisition unit configured to acquire a first image captured by coded exposure in which a transfer unit that transfers a signal from a photoelectric conversion unit to a charge holding unit is driven for n times, wherein n is an integer of 2 or greater, and to acquire a second image captured by driving the transfer unit for m times, wherein m is an integer less than n; an image correction processing unit configured to generate a third image by performing blur correction processing on the first image, and an image comparison unit configured to evaluate a plurality of images including at least two of the first image, the second image, and the third image, and to select an image of which evaluation is the highest among the plurality of images as an output image, or to increase a weight, which is assigned to each of the plurality of images when an output image is generated by combining the plurality of images, for an image of which evaluation is highest among the plurality of images, relative to those of the other images.

A second aspect of the present invention provides an image pickup system having an image pickup device that includes a photoelectric conversion unit, a charge holding unit and a transfer unit, and the image processing apparatus according to the first aspect, configured to acquire the first image and the second image from the image pickup device, and to generate an output image.

A third aspect of the present invention provides a moving apparatus having: the image pickup system according to the second aspect, and a control unit configured to control the moving apparatus using an output image acquired by the image pickup system.

According to the present invention, a high quality image with minimal blur can be easily acquired.

Further features of the present invention will become apparent from the following description of exemplary embodiments with reference to the attached drawings.

DESCRIPTION OF THE EMBODIMENTS

Embodiment 1

(Image Pickup System)

Figure 1:
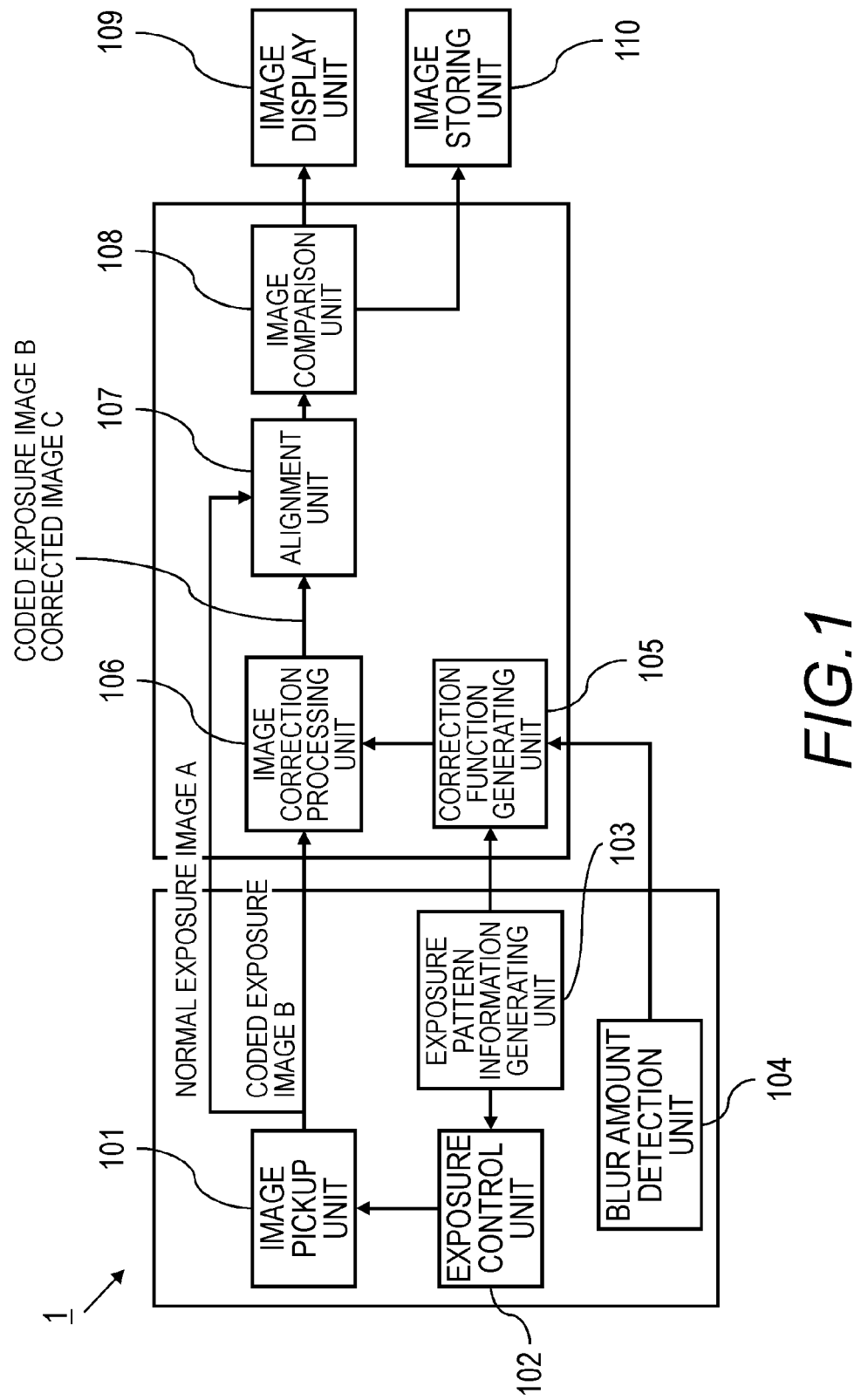
FIG. 1 is a block diagram depicting a configuration of an image pickup system.

FIG. 1 is a block diagram depicting a configuration of an image pickup system according to Embodiment 1 of the present invention. The image pickup system 1 includes an image pickup portion that images an object and acquires a normal exposure image A and a coded exposure image B, an image processing portion that generates an image of which blur is eliminated or reduced, based on the normal exposure image A and the coded exposure image B, and an image output portion which outputs the image. In the configuration example in FIG. 1, the image pickup portion includes an image pickup unit 101, an exposure control unit 102, an exposure pattern information generating unit 103, and a blur amount detection unit 104, and the image processing portion includes a correction function generating unit 105, an image correction processing unit 106, an alignment unit 107, and an image comparison unit 108. For the image output portion, an image display unit 109 that displays an image, and an image storing unit 110 which stores data of an image, are disposed.

The image pickup unit 101 is a functional unit that images an object and outputs a digital image, and includes an optical system (e.g. a lens, and an aperture stop), and an image pickup element (e.g. a CMOS image sensor, or a CCD image sensor). The exposure pattern information generating unit 103 is a functional unit that generates exposure pattern information for defining the exposure pattern (temporal modulation of exposure) during imaging. The exposure control unit 102 is a functional unit that controls exposure of the image pickup unit 101 according to the provided exposure pattern information. The blur amount detection unit 104 is a functional unit that detects the blur of the image pickup portion and/or the object during imaging, and includes a sensor for detecting motion (e.g. a gyro sensor, and an acceleration sensor). The blur amount detection unit 104 may detect blur, which was generated during imaging, by digital image processing based on a plurality of signals outputted from the image pickup unit 101, or a sum signal or a difference signal thereof. Needless to say, blur detection by a sensor and blur detection by the digital image processing may be combined.

The correction function generating unit 105 is a functional unit that generates a blur correction function based on the exposure pattern during imaging and the detected blur. The image correction processing unit 106 is a functional unit that performs blur correction processing for a coded exposure image B using the correction function. The alignment unit 107 is a functional unit that aligns a plurality of inputted images, and the image comparison unit 108 is a functional unit that evaluates, compares, and selects images, so as to generate an image that is finally outputted. The images subject to alignment and comparison may be two images of the normal exposure image A and image C after the blur correction processing, or may be three images, including the coded exposure image B, before correction as well.

The general operation of the image pickup system 1 having the above configuration is as follows. The exposure pattern information of the normal exposure and the exposure pattern information of the coded exposure, generated by the exposure pattern information generating unit 103 are sent to the exposure control unit 102. The exposure control unit 102 controls exposure by the image pickup unit 101 based on the exposure pattern information, and the image pickup unit 101 executes imaging by the normal exposure and imaging by the coded exposure. Thereby, two types of image signals of the normal exposure image A and the coded exposure image B of a same object are outputted from the image pickup unit 101.

The blur amount detection unit 104, on the other hand, detects traces of blur of the image pickup portion and the object during imaging. The correction function generating unit 105 generates the blur correction function using the information of the trace of blur acquired from the blur amount detection unit 104 and the exposure pattern information acquired from the exposure pattern information generating unit 103. Using this correction function, the image correction processing unit 106 corrects the coded exposure image B outputted from the image pickup unit 101, and acquires the corrected image C. The image correction processing unit 106 may output, not only the image C after blur correction processing, but also the coded exposure image B before blur correction. The alignment unit 107 aligns the positions of the images A and C (or A, B, and C). At least two images that are aligned are inputted to the image comparison unit 108. If the size and relative position of the image A and the image B outputted from the image pickup unit 101 are exactly the same, the processing by the alignment unit 107 may be omitted.

The image comparison unit 108 evaluates the quality of a plurality of inputted images (images A and C, or images A, B, and C in this embodiment), and selects one of the plurality of images as an output image (one frame of an image). At this time, it is preferable that the image comparison unit 108 selects an image of which evaluation is high (quality is high) with priority. Further, the image comparison unit 108 may combine a plurality of images into an output image. In this case as well, it is preferable that the image comparison unit 108 generates the combined image using images of which quality is high with priority (combined processing will be described in detail later). The output image selected or combined in the image comparison unit 108 is displayed on the image display unit 109. The data of the output image may be stored in the image storing unit 110.

(Apparatus Configuration Example)

Figure 2:
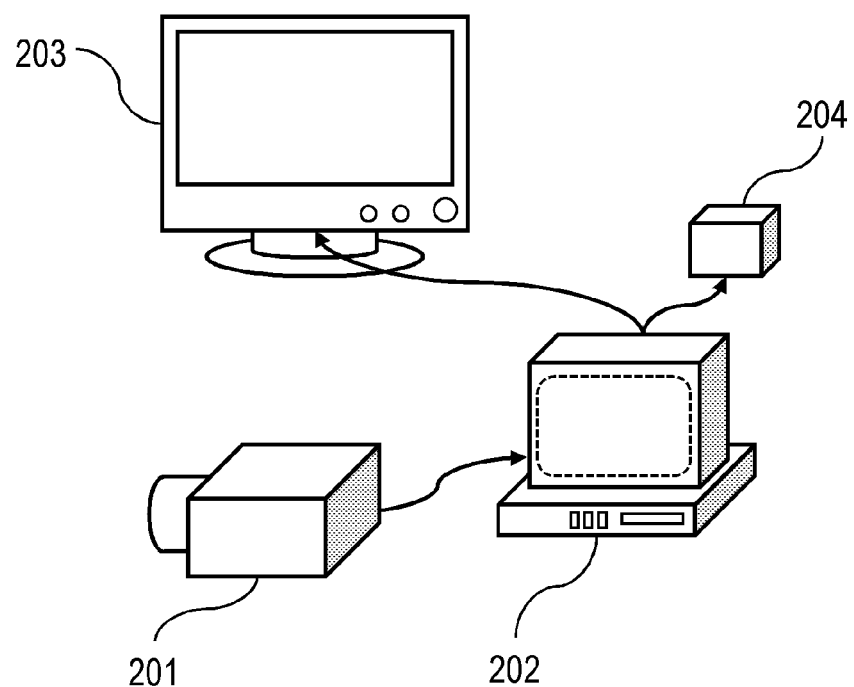
FIG. 2 is an illustration depicting an example of an apparatus configuration according to Embodiment 1.

FIG. 2 is a diagram depicting an example of the apparatus configuration of the image pickup system. The image pickup system in FIG. 2 is constituted by an image pickup device 201, an image processing apparatus 202, an image display device 203, and an image storing device 204. The image pickup device 201 is a digital camera or a digital video camera, and includes the image pickup unit 101, the exposure control unit 102, the exposure pattern information generating unit 103, and the blur amount detection unit 104 in FIG. 1. The image processing apparatus 202 is a general purpose or dedicated computer which includes a CPU (processor), a memory and a storage (e.g., HDD, or SSD). The functions of the correction function generating unit 105, the image correction processing unit 106, the alignment unit 107, and the image comparison unit 108 in FIG. 1 are implemented by loading the image processing program, which is stored in the storage, in the memory, and the CPU executing this program. The image display device 203 is a liquid crystal display, an organic EL display, or the like, and corresponds to the image display unit 109 in FIG. 1. The image storing device 204 is a storage (e.g., HDD, or SSD) or a recording medium (e.g., a USB memory, or a memory card), and corresponds to the image storing unit 110 in FIG. 1.

The apparatus configuration in FIG. 2 is an example, and the configuration of the present invention is not limited to this. For example, the image pickup portion, the image processing portion and the image output portion in FIG. 1 may be constituted by one device using a computer (including a smartphone and tablet terminal), which includes a camera and a display. Further, the image processing portion and the image output portion may be disposed in a digital camera or a digital video camera. Furthermore, the image processing portion may be constituted by a plurality of computers. A part of the image pickup portion and the image processing portion may be constituted by an ASIC or an FPGA, or may be executed by a cloud-based server.

(Image Acquisition Processing)

Figure 3:
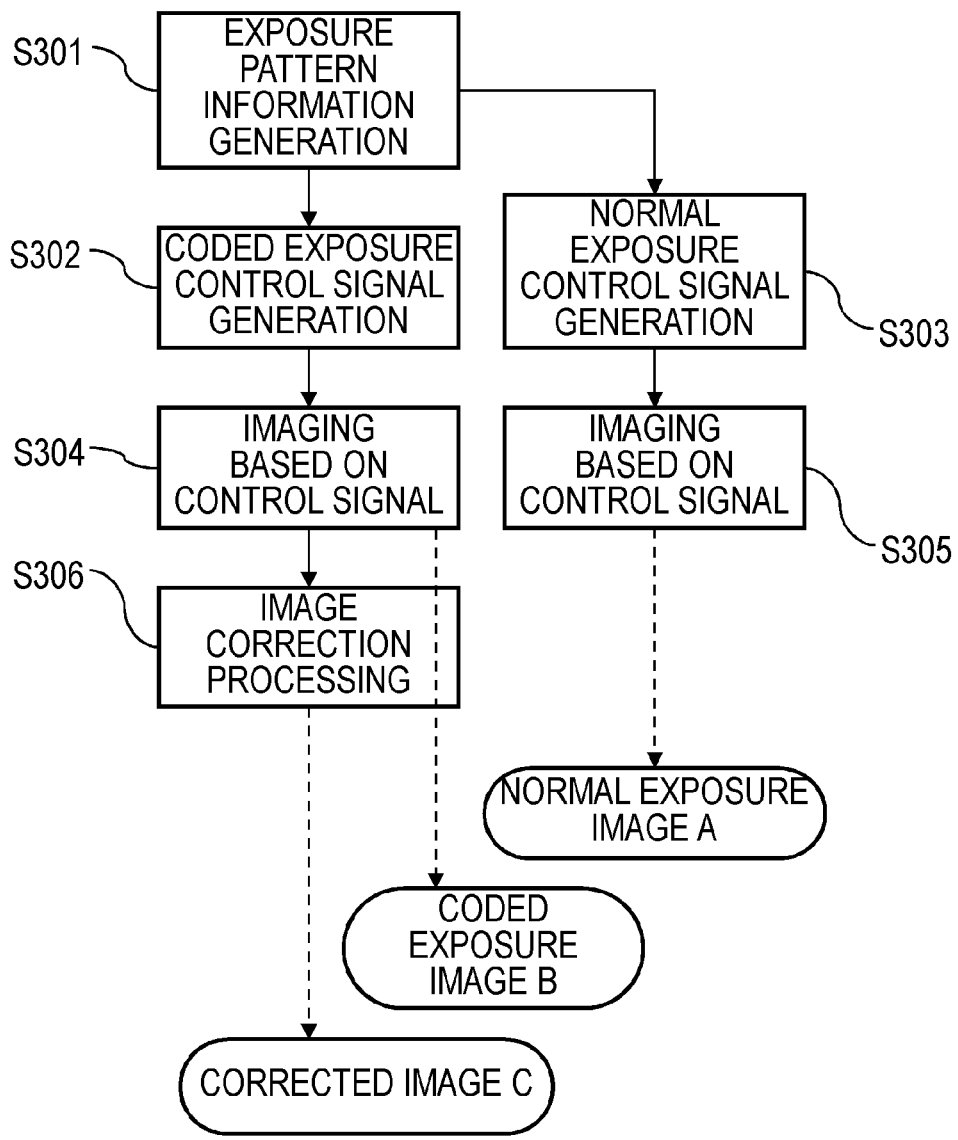
FIG. 3 is a flow chart depicting processing of acquiring three patterns of images.

FIG. 3 is a flow chart depicting processing of acquiring three patterns of images. First, the exposure pattern information generating unit 103 generates the exposure pattern information for the normal exposure and the exposure pattern information for the coded exposure (step S301). The exposure pattern information is sent to the exposure control unit 102. The exposure control unit 102 generates the coded exposure control signal and the normal exposure control signal in accordance with the exposure pattern information (steps S302, S303). These control signals are inputted to the image pickup unit 101. The image pickup unit 101 controls exposure based on the control signal, and performs imaging (steps S304, S305). The image captured based on the normal exposure control signal is outputted as a normal exposure image A. The image captured based on the coded exposure control signal is outputted as a coded exposure image B. The normal exposure image A and the coded exposure image B are loaded onto the image processing apparatus 202 via an image input interface (image acquisition unit) (not illustrated). Further, the coded exposure image B, which is subjected to the blur correction processing (step S306), is outputted as the corrected image C after the blur correction processing. In the example shown in FIG. 3, the normal exposure imaging and the coded exposure imaging are processed in parallel, but the normal exposure imaging and the coded exposure imaging may be executed in sequence.

(Exposure Pattern)

Figure 4:
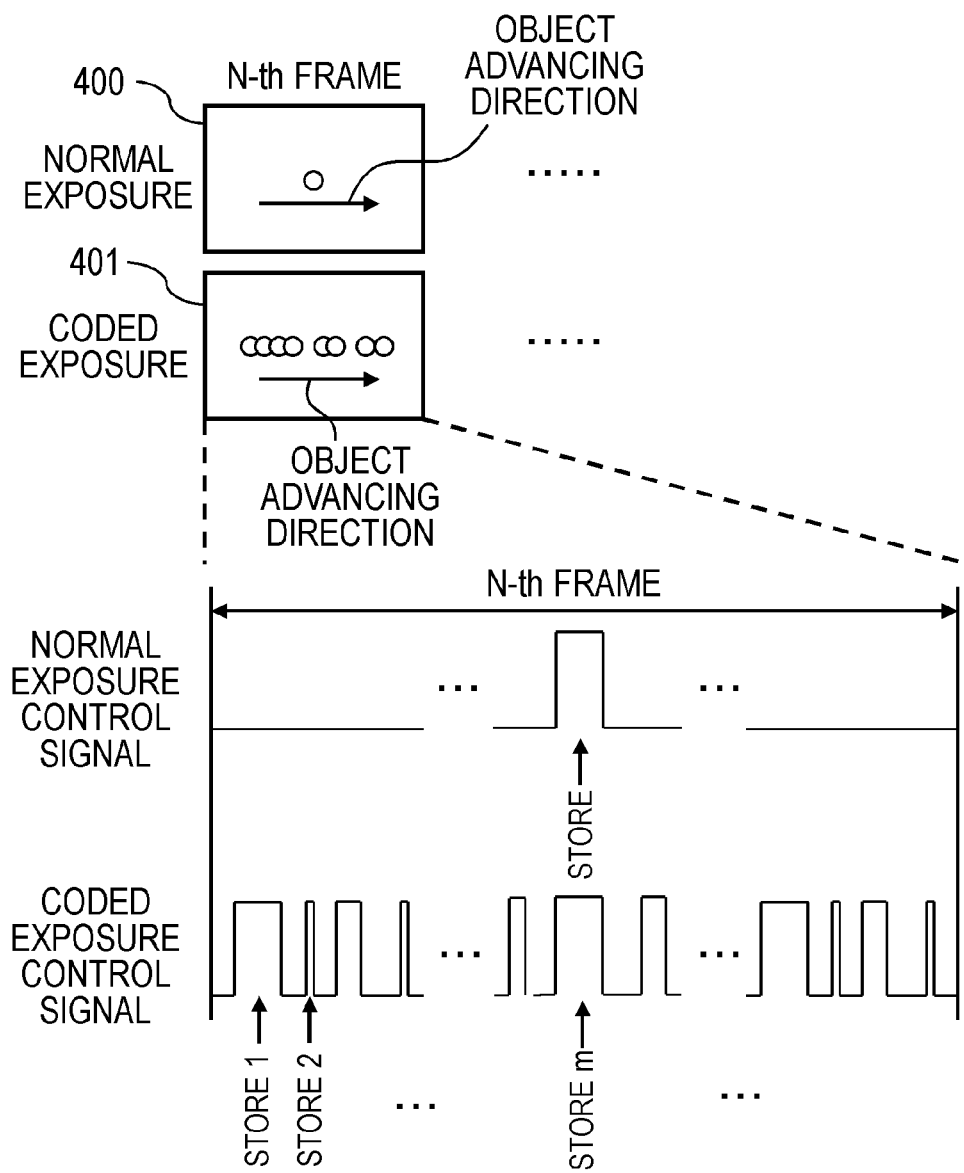
FIG. 4 is a conceptual diagram depicting the exposure patterns of the normal exposure and the coded exposure.

FIG. 4 is a conceptual diagram depicting exposure patterns of the normal exposure and the coded exposure. In this embodiment, the coded exposure refers to an image pickup method of performing exposure a plurality of times in temporal coding in one frame. The normal exposure refers to an image pickup method of performing exposure a fewer number of times than that of the coded exposure in one frame (image pickup period). In other words, if a number of times of exposure performed in the normal exposure is once, a number of times of exposure performed in the coded exposure is at least twice. Here, the number of times of exposure refers to a number of times of transferring charges from the photoelectric conversion unit to the charge holding unit, which is described next. Exposure can be controlled by controlling open/close of the shutter, but it is preferable to control exposure by controlling the charge storing period at each pixel of the image pickup element due to simplicity.

The lower part of FIG. 4 shows examples of the exposure control signals in the case of controlling exposure by controlling the storage period. The normal exposure control signal is a signal having one continuous storage period. Therefore, the captured image acquired by the normal exposure is like the captured image 400 in FIG. 4. The coded exposure control signal, on the other hand, is a signal having a discontinuous storage period. Therefore, the captured image acquired by the coded exposure is like the captured image 401 in FIG. 4. For the exposure pattern of the coded exposure here, a pattern that is commonly used in the coded exposure techniques may be used.

(Image Pickup Unit)

Figure 5:
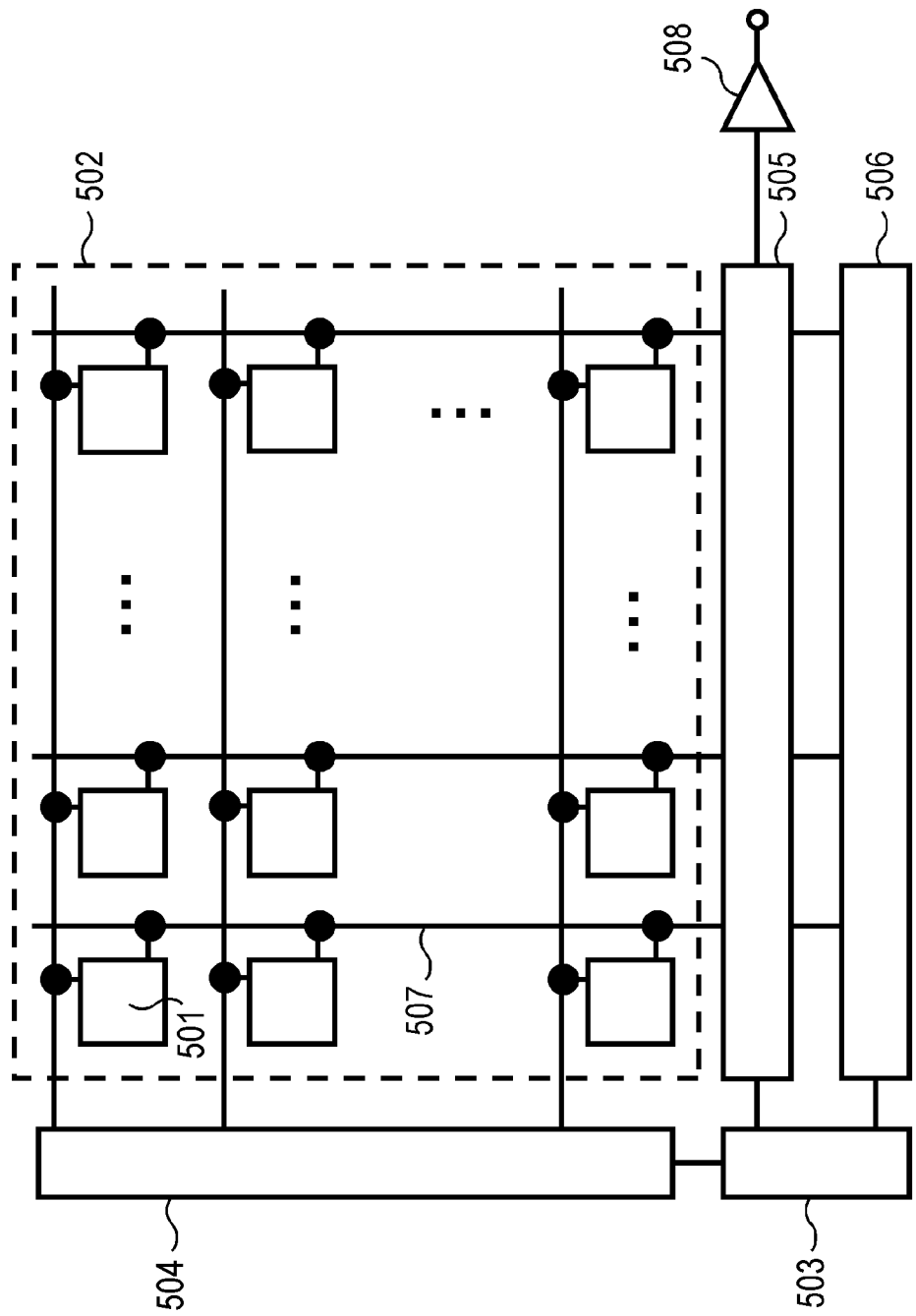
FIG. 5 is a block diagram depicting an example of a configuration of an image pickup element.

FIG. 5 is a block diagram depicting an example of the configuration of the image pickup element included in the image pickup unit 101. The image pickup element is a CMOS image sensor, and includes a pixel unit 502, a pulse generating unit 503, a vertical scanning circuit 504, a column circuit 505, a horizontal scanning circuit 506, a signal line 507, and an output circuit 508. In the pixel unit 502, a plurality of pixels 501 are disposed in a matrix. The vertical scanning circuit 504 receives a control pulse from the pulse generating unit 503, and supplies a driving pulse to each pixel. For the vertical scanning circuit 504, such logical circuits as a shift register and an address decoder are used. The signal line 507 is disposed for each pixel column of the pixel unit 502, and a signal from a pixel is outputted to the signal line 507. The column circuit 505 includes an analog/digital conversion unit, and may also include an amplification circuit, and the like. To the column circuit 505, signals that are inputted in parallel via the signal lines 507 are inputted, so that the analog/digital conversion and predetermined processing are performed. The predetermined processing here is noise removal and signal amplification, for example. The horizontal scanning circuit 506 supplies a driving pulse to the column circuit 505, so as to output the signals processed by the column circuit 505 in sequence. The output circuit 508 is constituted by a buffer amplifier, a differential amplifier, and the like, and outputs a pixel signal from the column circuit 505 to outside (e.g., an image processing portion) the image pickup unit 101.

Figure 6:
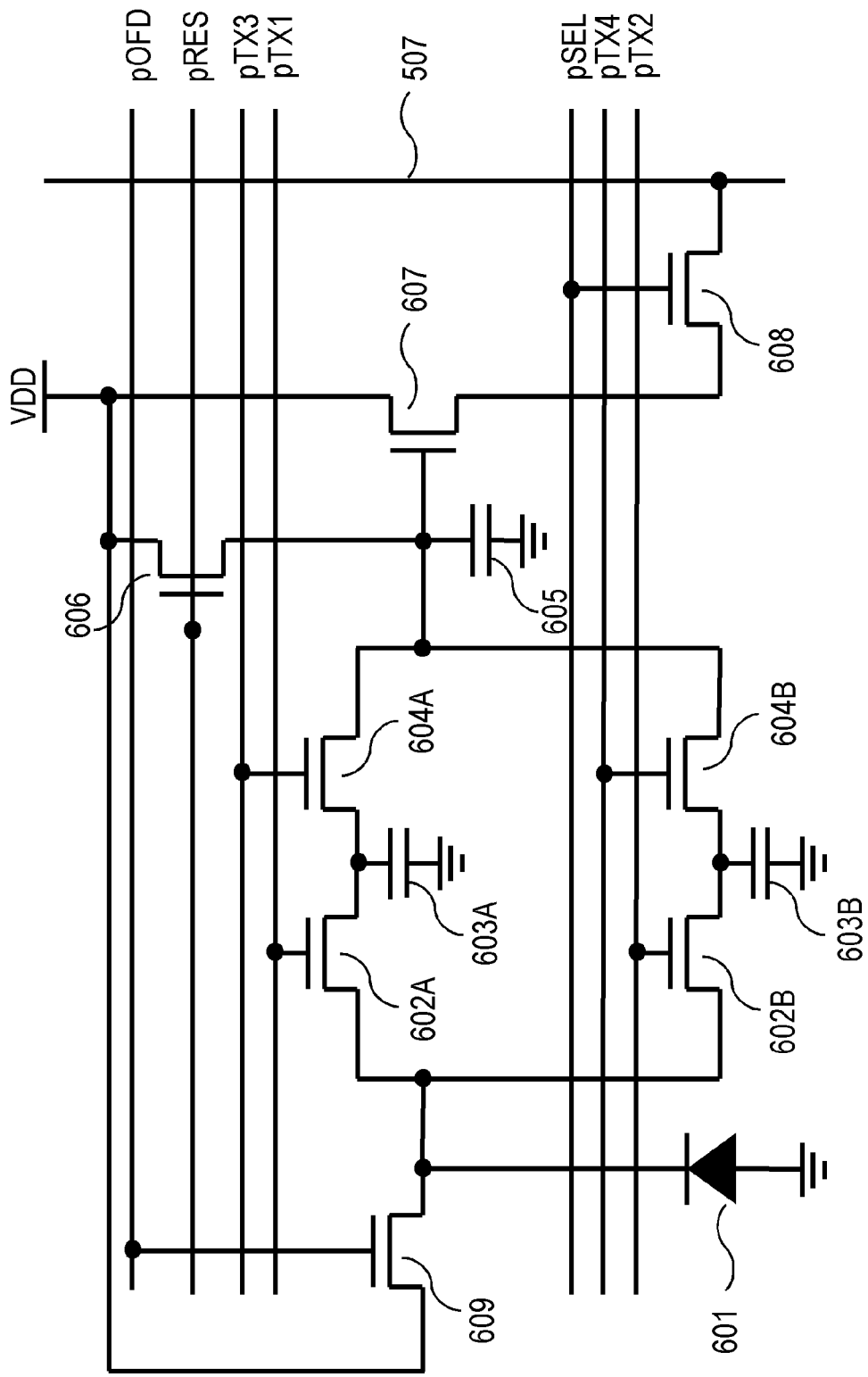
FIG. 6 is a diagram depicting an example of an equivalent circuit of a pixel unit.

FIG. 6 is an example of an equivalent circuit of the pixel unit 502. A photoelectric conversion unit 601 generates a charge pair in accordance with the incident light, and stores electrons as signal charges. For the photoelectric conversion unit 601, a photodiode is used, for example. A charge holding unit 603A (first charge holding unit) and a charge holding unit 603B (second charge holding unit) hold the electrons transferred from the photoelectric conversion unit 601 via a later mentioned transfer unit 602A (first transfer unit) and transfer unit 602B (second transfer unit).

A floating diffusion (hereafter FD) 605 is a semiconductor region to which charges held by the charge holding unit 603A and the charge holding unit 603B are transferred via the transfer unit 604A (third transfer unit) and the transfer unit 604B (fourth transfer unit). The FD 605 holds charges for a predetermined period.

The transfer unit 602A transfers electrons generated in the photoelectric conversion unit 601 to the charge holding unit 603A. The transfer unit 602B transfers electrons generated in the photoelectric conversion unit 601 to the charge holding unit 603B. The transfer unit 604A transfers the electrons held in the charge holding unit 603A to the FD 605. The transfer unit 604B transfers the electrons held in the charge holding unit 603B to the FD 605. To the transfer unit 602A, the transfer unit 602B, the transfer unit 604A and the transfer unit 604B, the driving pulses pTX1, pTX2, pTX3 and pTX4 are supplied respectively, so as to switch between ON and OFF. Electrons are transferred when each transfer unit turns ON. For each transfer unit 602A, 602B, 604A and 604B, a transfer transistor is used, for example.

A transfer unit 609 (fifth transfer unit) transfers electrons generated in the photoelectric conversion unit 601 to a discharging unit. The discharging unit is a node to which the power supply voltage VDD is supplied, for example. To the transfer unit 609, a driving pulse pOFD is supplied, so that ON and OFF are switched by the driving pulse pOFD. Electrons of the photoelectric conversion unit 601 are transferred to the discharging unit when the transfer unit 609 turns ON.

For an amplification unit 607, an amplification transistor is used, for example. In this case, the input node of the amplification unit 607 is electrically connected to the FD 605, to a wire connected to a gate, and to a source of a reset transistor 606. The amplification unit 607 amplifies a signal based on the electrons transferred to the FD 605 by the transfer unit 604A and the transfer unit 604B, and outputs the signal. In concrete terms, the electrons transferred to the FD 605 are converted into voltage in accordance with the amount of electrons, and an electrical signal, in accordance with the voltage, is outputted to the signal line 507 via the amplification unit 607. The amplification unit 607 and a current source (not illustrated) constitute a source follower circuit. The reset transistor 606 resets the potential of the input node of the amplification unit 607 to a potential close to the power supply potential VDD. To the gate of the reset transistor 606, a driving pulse pRES is supplied, so as to switch between ON and OFF.

A selection transistor 608 switches between connection/disconnection of the pixel 501 to the signal line 507. By switching the selection transistor 608 of each pixel 501, a signal of the pixel 501 is outputted to the signal line 507 one pixel at a time, or a plurality of pixels at a time. The drain of the selection transistor 608 is connected to the output node of the amplification unit 607, and the source of the selection transistor 608 is connected to the signal line 507. To the gate of the selection transistor 608, a driving pulse pSEL is supplied, and the line is selected by switching between ON and OFF of the selection transistor 608.

Instead of the configuration of this embodiment, the selection transistor 608 may be disposed between the output node of the amplification unit 607 and the power line to which the power supply voltage VDD is supplied. The output node of the amplification unit 607 and the signal line 507 may be connected without disposing the selection transistor 608.

In this pixel configuration, if the transfer unit 602A is driven by the normal exposure control signal in FIG. 4, and if the transfer unit 602B is driven by the coded exposure control signal, the charges generated by the normal exposure are stored in the charge holding unit 603A, and the charges generated by the coded exposure are stored in the charge storing unit 603B. Then, the transfer unit 604A and the transfer unit 604B are driven at different timings, so that an electrical signal corresponding to the stored charges, due to the normal exposure and the electrical signal corresponding to the stored charges due to the coded exposure, are independently acquired from the signal line 507, whereby two types of image signals (normal exposure image signal and the coded exposure image signal) can be acquired. In the case of performing this control, as exemplified in FIG. 4, the exposure patterns of the normal exposure and the coded exposure may be set such that the storage period of the normal exposure matches with one of a plurality of storage periods of the coded exposure.

If the configuration of the global electronic shutter having two memories (charge holding units 603A and 603B) is used as in this embodiment, two types of images (normal exposure image and coded exposure image) can be captured simultaneously (in parallel) using one image pickup element (that is, with the same optical axis and field of view). Therefore, two types of images, which have no temporal or spatial deviation, can easily be acquired. In the case of a pixel configuration using one memory, the normal exposure image and coded exposure image may be captured in sequence (consecutively in time).

(Blur Correction Processing)

Figure 7:
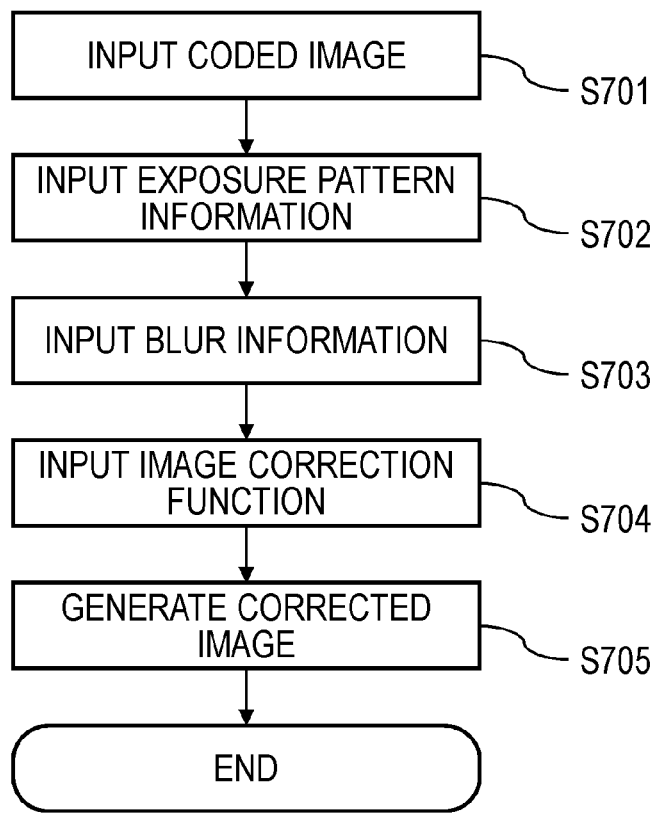
FIG. 7 is a flow chart depicting blur correction processing.

FIG. 7 is a flow chart depicting the blur correction processing by the image correction processing unit. First, a coded exposure image B captured by the image pickup unit 101 is inputted to the image correction processing unit 106 (step S701). Further, the exposure pattern information generated by the exposure pattern information generating unit 103 and the blur information acquired by the blur amount detection unit 104 are inputted to the correction function generating unit 105 (steps S702, S703). Using this information, the correction function generating unit 105 determines the correction function to specify the blur of the coded exposure image B. The correction function is a point spread function (PSF), for example. The determined correction function is inputted to the image correction processing unit 106 (step S704). Then, the image correction processing unit 106 performs the blur correction processing (restoration processing) on the coded exposure image B using the correction function, and generates the image C after the blur correction processing (step S705). Hereafter, the image C after the blur correction processing is referred to as the "corrected image C".

In this embodiment, it is assumed that the blur correction processing is performed on the entire coded exposure image B, but the blur correction processing may be performed, not on the entire image, but only on a partial region of the image. For example, the image correction processing unit 106 may detect a region in which blur is conspicuous, or a region in which a specific object (e.g., an individual, or a moving body) is captured, and perform the blur correction processing only on this region. Further, the image correction processing unit 106 may perform the blur correction processing only on a predetermined region of the image (e.g., a center region of image). By limiting the range in which the blur correction processing is performed, the time required for the correction processing can be decreased.

(Image Comparison Selection Processing)

Figure 8:
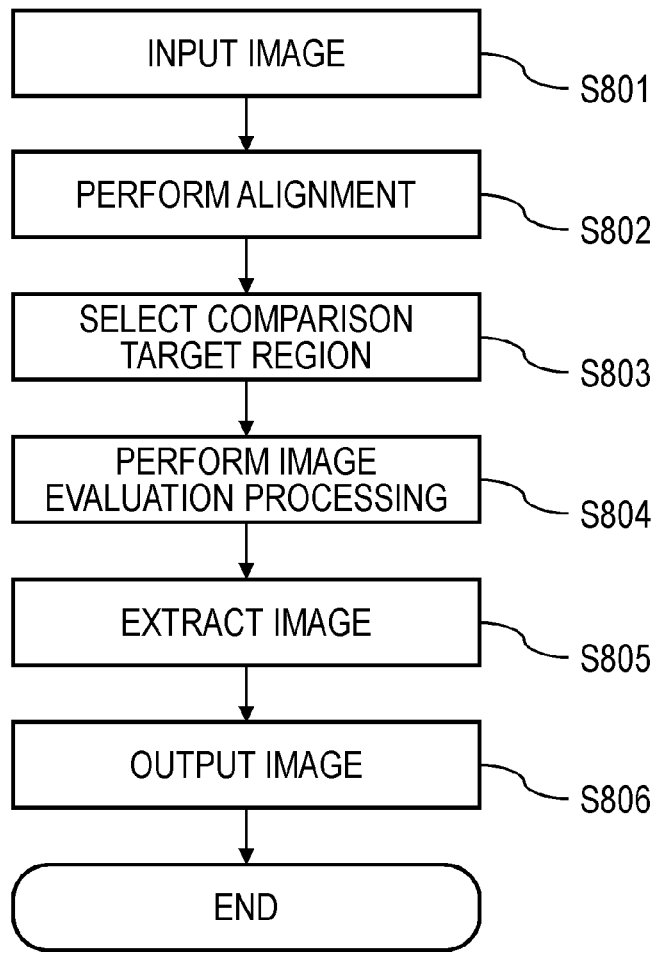
FIG. 8 is a flow chart depicting image comparison selection processing.

FIG. 8 is a flow chart depicting processing of evaluating, comparing, and selecting images. First, the normal exposure image A and the coded exposure image B, captured by the image pickup unit 101, and the corrected image C generated by the image correction processing unit 106, are inputted to the alignment unit 107 (step S801), and the relative positions of the images are adjusted (step S802). For the alignment method, a commonly available method may be used. For example, a method of extracting the feature points from the images and aligning the positions of the feature points to the reference positions, or a method of determining the normalized correlation of each image, and determining the position, where the correlation value is highest, is available. If the images A, B, and C have no spatial positional deviation, the processing in step S802 may be omitted. After alignment, each image is inputted to the image comparison unit 108.

The image comparison unit 108 compares at least two types of images. First, the image comparison unit 108 selects a comparison target region (step S803). The comparison target region may be the entire image or an arbitrary region of the image. Then, the image comparison unit 108 performs the image evaluation processing in the comparison target region (step S804). The image evaluation processing is processing of calculating a value of a predetermined evaluation index for the comparison target region of each image, and evaluating the quality of each image using this evaluation index. This image quality evaluation can be either a relative evaluation of a plurality of images, or an absolute evaluation for a predetermined evaluation index. For the evaluation indices of the relative evaluation and absolute evaluation, any index that can reflect the image quality may be used, such as noise, contrast, and brightness. If a reference image to be a reference for comparison is available, evaluation indices, such as the peak signal-to-noise ratio (PSNR) or the structural similarity (SSIM), may be used.

The image comparison unit 108 extracts an image having the highest evaluation index value (in other words, an image having the best quality) from the plurality of images (step S805). At this time, it is possible that any one of the normal exposure image A, the coded exposure image B, and the corrected image C is extracted. This is because the relative merits of the quality of each image may change depending on the actual imaging conditions, the degree of blur of the object, or the image pickup unit. The image comparison unit 108 of this embodiment performs the processing of extracting one image having the best quality out of a plurality of comparison target images, but at least two images may be selected from a plurality of images and combined into an output image. Finally, the extracted image is outputted to the image display unit 109 and/or the image storing unit 110 (step S806).

Figure 9:
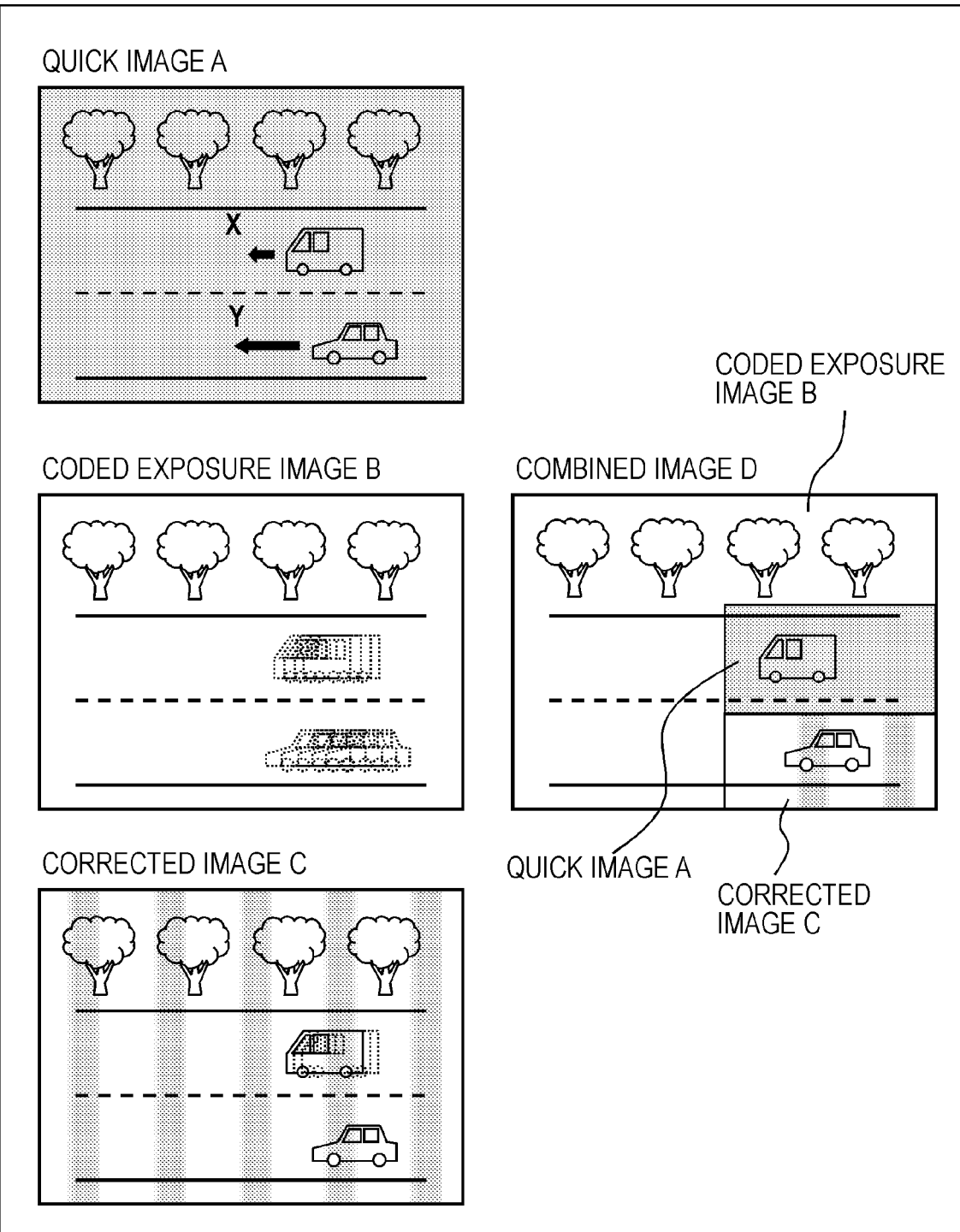
FIG. 9 is image examples.

FIG. 9 shows a schematic diagram depicting examples of the normal exposure image A, the coded exposure image B, the corrected image C, and the combined image (output image) D, which is finally outputted. It is assumed that moving bodies X and Y, which move at different velocities (velocity of the moving body Y>velocity of the moving body X), and a background that does not move, are imaged. The normal exposure image A in FIG. 9 is an image which was captured at a storage time that is short enough that is does not cause blur of the moving body Y (hereafter called "quick image A"). In the case of the image pickup unit 101 in FIG. 5, the storage time to store charges in the photoelectric conversion unit 601 and the exposure time may be regarded as equivalent. The coded exposure image B in FIG. 9 is an image captured in accordance with a certain coded exposure pattern. The total storage time of the coded exposure is longer than that of the normal exposure, hence, the noise level of the entire coded exposure image B is normally less than the quick image A. However, as the storage time becomes longer, the blur of the moving body increases. The corrected image C in FIG. 9 is an image after the blur correction processing is subjected to the coded exposure image B. Here, the blur of the moving body Y, which moves at high-speed, has been sufficiently eliminated, but the blur of the moving body X, which moves at a low-speed, has not been completely eliminated, and the moving body X is not appropriately restored. In the corrected image C, periodic noise is generated due to the blur correction processing.

The image comparison unit 108 selects and outputs one image, out of the three types of images A, B, and C, based on the evaluation indices. Or, the image comparison unit 108 may combine at least two images, out of the three images A, B, and C, to generate the outputted image. For the method of combining images, the following methods may be used, for example.

(Method 1)

Each of the images A, B, and C is divided into sub-regions, and for each sub-region, an image having the highest evaluation index is selected out of the images A, B, and C, and the selected images of each sub-region are combined (merged) to generate a complete image. In other words, Method 1 is a method of collecting portions having high evaluation out of the images A, B, and C like patch work, whereby one image is combined. The combined image D in FIG. 9 is an example of an image acquired by this method. In a region of a background that does not move, the coded exposure image B is selected, and in a region of the low-speed moving body X, the quick image A is selected, and in a region of the high-speed moving body Y, the corrected image C is selected. In the combined image D in FIG. 9, each boundary between different images is drawn, but, in actual combining processing, a natural combined image, in which the boundaries do not stand out, is generated by smoothing the boundary portions, gradually blending adjacent images, or matching the brightness levels among the images.

(Method 2)

Each image A, B, and C is divided into a sub-region, and for each sub-region, the images A, B, and C are weighted in accordance with the value of the evaluation index, are then combined, and the combined image of each sub-region is merged to generate a complete image. In other words, Method 2 is a method of weighting the images A, B, and C, and combining the weighted images for each sub-region. The weight may be set to be higher as the value of the evaluation index is higher (evaluation is better). At this time, a weight of an image of which value of the evaluation index is the lowest, or an image of which value of the evaluation index is lower than a predetermined threshold (tolerance), may be set to zero. Thereby, only images having high evaluation index values are combined, and, as a result, the quality of the final combined image can be improved. In Method 2 as well, it is preferable to perform processing to smooth the boundaries of the combined sub-regions, similar to Method 1.

(Method 3)

The images A, B, and C are weighted in accordance with the value of the evaluation index, and are combined. The difference from Method 2 is that the entire image is weighted in Method 3, while the images are weighted and combined in sub-region units in Method 2. In this case as well, weight may be set to zero for an image of which value of the evaluation index is lowest, or an image of which value of the evaluation index is lower than a predetermined threshold (tolerance).

As described above, according to the image pickup system of this embodiment, a normal exposure image, a coded exposure image, and an image after the blur correction processing are evaluated and compared, and an image selected from these images or an image generated by combining these images, based on this evaluation and comparison result, is outputted as a final image. Therefore, a high quality image with minimal blur can be acquired, regardless the illuminance of the object, the imaging environment, the velocity of the object, and the like. Further, in the method of this embodiment, it is unnecessary to estimate the relative merits between the normal exposure and the coded exposure before imaging, as in the case of prior art. Hence, imaging can be performed immediately, and the chance of capturing a desired object is not missed.

Embodiment 2

Figure 10:
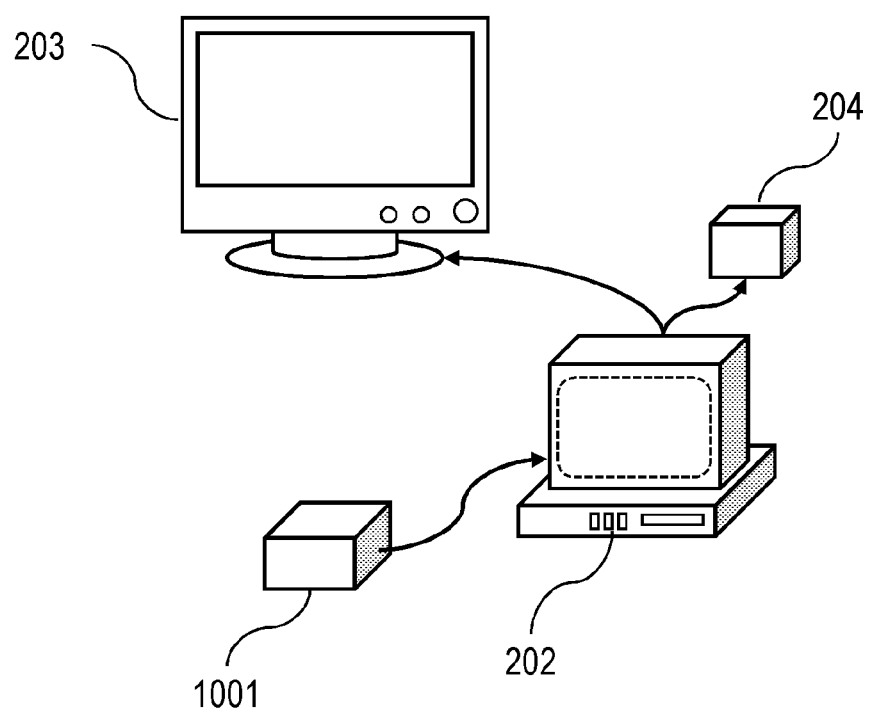
FIG. 10 is an illustration depicting an example of an apparatus configuration according to Embodiment 2.

FIG. 10 shows an illustration depicting a system configuration according to Embodiment 2. In Embodiment 2, an image is inputted to the image processing apparatus 202 by an image storing device 1001, instead of the image pickup device 201. In the image storing device 1001, a normal exposure image A, a coded exposure image B, and a corrected image C after the blur correction processing are stored in advance, and these images A, B, and C are sent to the image processing apparatus 202 as required. The image storing device 1001 is, for example, a recorder, an image database, an image server, or a storage where image data is stored. The remainder of the configurations and operations of the image processing apparatus 202 (image acquisition processing, blur correction processing, image comparison selection processing) are the same as those in Embodiment 1.

By this configuration, a system that is suitable for such an application as a monitoring camera, which requires no processing in real-time, but requires higher precision images for image analysis in the case of an emergency, can be provided. In Embodiment 2, three images (the normal exposure image A, the coded exposure image B, and the corrected image C) are stored in the image storing device 1001, but only the normal exposure image A and the coded exposure image B may be stored in the image storing device 1001. In the case of the latter configuration, it is preferable that the image processing apparatus 202 acquires the normal exposure image A and the coded exposure image B from the image storing device 1001, and generates the corrected image C from the coded exposure image B.

Embodiment 3

Figure 11:
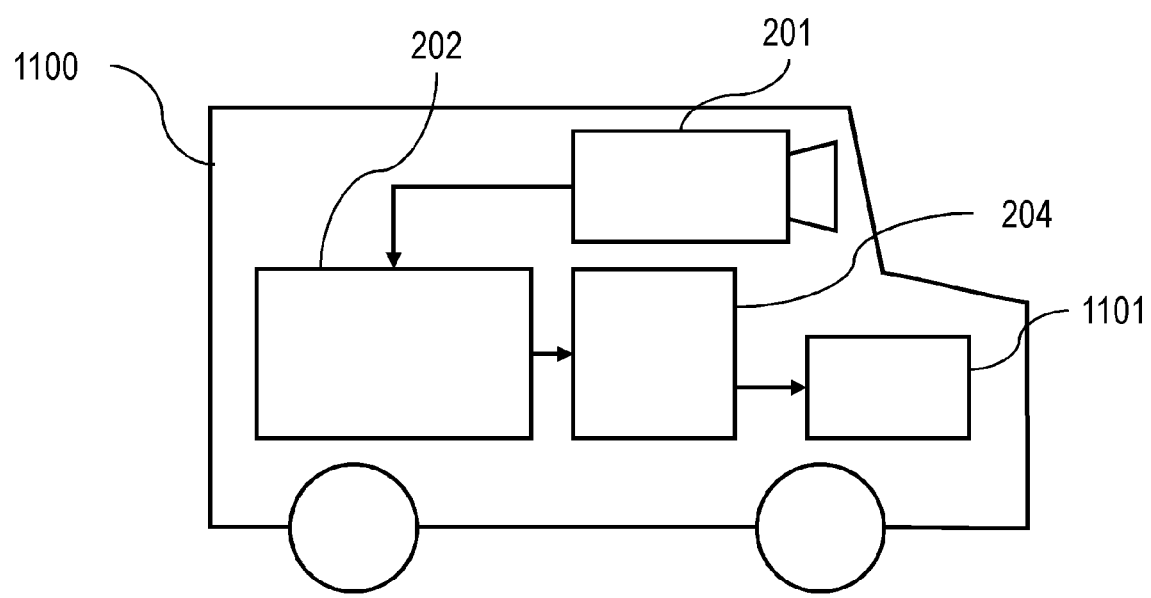
FIG. 11 is an illustration depicting an example of an apparatus configuration according to Embodiment 3.

FIG. 11 shows an illustration depicting a system configuration according to Embodiment 3. Embodiment 3 is an example when the system according to the present invention is installed in a moving apparatus, such as a vehicle 1100. The remainder of the configurations and operations of the image processing apparatus 202 (image acquisition processing, blur correction processing, image comparison selection processing) are the same as those in Embodiment 1. An image selected or combined by the image comparison unit 108 is stored in the image storing device 204. This image is used for a control unit 1101 of the vehicle 1100 to control the vehicle 1100 (e.g., automatic operation, collision prevention). According to this system, an image with minimal image quality deterioration can be acquired without missing a chance of capturing an object. Hence, the accuracy of the image used for control can be improved.

Other Embodiments

The present invention can also be implemented by supplying a program, which implements at least one function of the above embodiments to a system or an apparatus via a network or a storage medium, and the program read and executed by at least one processor of a computer in the system or the apparatus. The present invention can also be implemented by a circuit (e.g., an ASIC), which implements at least one function of the above embodiments.

The above mentioned embodiments are merely examples of the present invention, and the scope of the present invention is not limited to the configurations of the above embodiments. For example, in the above embodiments, the normal exposure image A and the corrected image C, or the normal exposure image A, the coded exposure image B, and the corrected image C are used as the comparison evaluation targets, but different combinations (e.g., images B and C) may be used as the comparison evaluation targets. An image other than the images A, B, and C may be added as the comparison evaluation target (e.g., an image after noise reduction process was performed may be added to the images A, B, and C).

Embodiments of the present invention can also be realized by a computer of a system or an apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   an acquisition unit configured to acquire a first image captured by coded exposure in which a transfer unit that transfers a signal from a photoelectric conversion unit to a charge holding unit is driven for n times, wherein n is an integer of 2 or greater, and to acquire a second image captured by driving the transfer unit for m times, wherein m is an integer less than n;
   an image correction processing unit configured to generate a third image by performing blur correction processing on the first image; and
   an image comparison unit configured to evaluate a plurality of images including at least two of the first image, the second image, and the third image, and to select an image of which evaluation is the highest among the plurality of images as an output image, or to increase a weight, which is assigned to each of the plurality of images when an output image is generated by combining the plurality of images, for an image of which evaluation is highest among the plurality of images, relative to those of the other images.

2. The image processing apparatus according to claim 1, wherein the image comparison unit divides each of the plurality of images into sub-regions, and compares quality, and selects an image or combines images for an output image for each sub-region.

3. The image processing apparatus according to claim 2, wherein the image comparison unit selects, for each sub-region, an image of which quality is the highest among the plurality of images, and generates the output image by combining the selected image of each sub-region.

4. The image processing apparatus according to claim 3, wherein the evaluation is an evaluation on noise.

5. The image processing apparatus according to claim 3, wherein the evaluation is an evaluation on contrast.

6. The image processing apparatus according to claim 3, wherein the evaluation is an evaluation on brightness.

7. The image processing apparatus according to claim 3, wherein the evaluation is an evaluation using the peak signal-to-noise ratio.

8. The image processing apparatus according to claim 3, wherein the evaluation is an evaluation using the structural similarity.

9. The image processing apparatus according to claim 1, wherein the image correction processing unit performs the blur correction processing only on a partial region of the first image.

10. The image processing apparatus according to claim 3, wherein the image correction processing unit performs the blur correction processing only on a partial region of the first image.

11. An image pickup system comprising:
    an image pickup device that includes a photoelectric conversion unit, a charge holding unit, and a transfer unit; and
    the image processing apparatus according to claim 1, configured to acquire the first image and the second image from the image pickup device, and to generate an output image.

12. An image pickup system comprising:
  an image pickup device that includes a photoelectric conversion unit, a charge holding unit, and a transfer unit; and
  the image processing apparatus according to claim 3, configured to acquire the first image and the second image from the image pickup device, and to generate an output image.

13. The image pickup system according to claim 11, wherein the image pickup device is configured such that a part of the period from start to finish of generating charges in the photoelectric conversion unit used for generating the first image and a part of the period from start to finish of generating charges in the photoelectric conversion unit used for generating the second image overlap.

14. The image pickup system according to claim 12, wherein the image pickup device is configured such that a part of the period from start to finish of generating charges in the photoelectric conversion unit used for generating the first image and a part of the period from start to finish of generating charges in the photoelectric conversion unit used for generating the second image overlap.

15. The image pickup system according to claim 13,
  wherein the image pickup device includes a pixel having the photoelectric conversion unit, the charge holding unit, and the transfer unit, and
  the pixel includes a first charge holding unit configured to hold charges of the photoelectric conversion unit used for generating the first image, and a second charge holding unit configured to hold charges of the photoelectric conversion unit used for generating the second image.

16. The image pickup system according to claim 14,
  wherein the image pickup device includes a pixel having the photoelectric conversion unit, the charge holding unit, and the transfer unit, and
  the pixel includes a first charge holding unit configured to hold charges of the photoelectric conversion unit used for generating the first image, and a second charge holding unit configured to hold charges of the photoelectric conversion unit used for generating the second image.

17. A moving apparatus comprising:
  the image pickup system according to claim 11; and
  a control unit configured to control the moving apparatus using an output image acquired by the image pickup system.

18. A moving apparatus comprising:
  the image pickup system according to claim 16; and
  a control unit configured to control the moving apparatus using an output image acquired by the image pickup system.

* * * * *